No. 751,333. PATENTED FEB. 2, 1904.
N. OBOLENSKU.
VALVE.
APPLICATION FILED MAR. 17, 1903.
NO MODEL.

WITNESSES:

INVENTOR
Nicholas Obolensku
BY
ATTORNEYS.

No. 751,333. Patented February 2, 1904.

UNITED STATES PATENT OFFICE.

NICHOLAS OBOLENSKU, OF HERMITAGE, NEW YORK, ASSIGNOR OF FIFTY-ONE ONE-HUNDREDTHS TO JOHN McGARVEY, OF ROCHESTER, NEW YORK.

VALVE.

SPECIFICATION forming part of Letters Patent No. 751,333, dated February 2, 1904.

Application filed March 17, 1903. Serial No. 148,193. (No model.)

*To all whom it may concern:*

Be it known that I, NICHOLAS OBOLENSKU, a citizen of the United States, and a resident of Hermitage, in the county of Wyoming and State of New York, have invented a new and Improved Valve, of which the following is a full, clear, and exact description.

The invention relates to check-valves, such as shown and described in Letters Patent of the United States No. 695,333, granted to me March 11, 1902.

The object of the present invention is to provide a new and improved valve, arranged to allow of regulating the speed of the water or other fluid passing through the valve to prevent leakage and to give convenient access to the parts for repairs and for quick replacement of worn-out parts and for other purposes.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1:
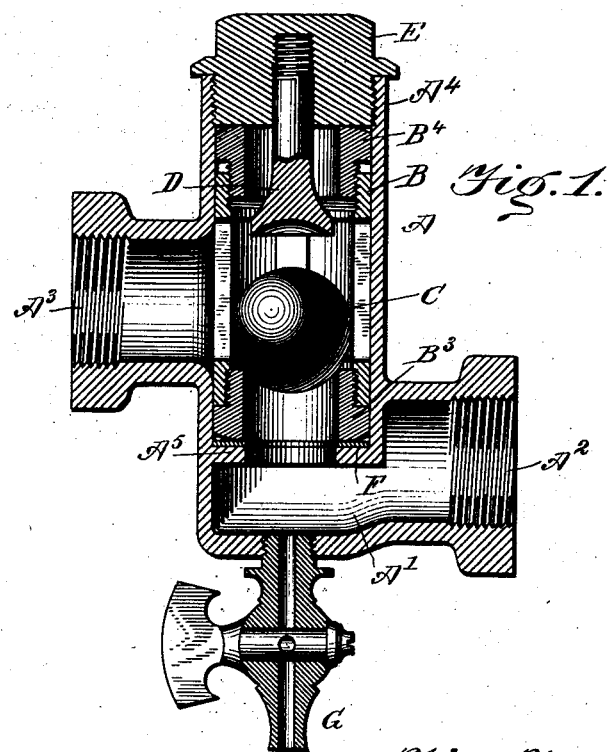
Figures 2, 3:
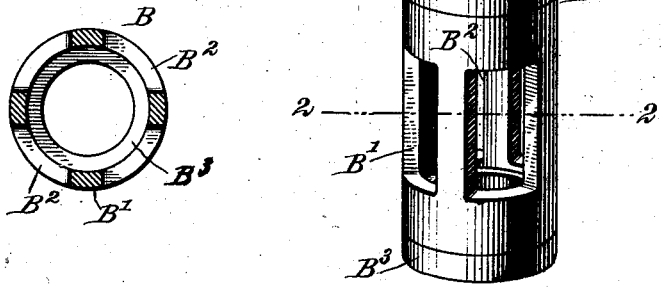

Figure 1 is a sectional side elevation of the improvement. Fig. 2 is a sectional plan view of the cage on the line 2·2 of Fig. 3, and Fig. 3 is a perspective view of the cage.

The valve-body A in its general construction is approximately the same as the one shown and described in the Letters Patent referred to and is provided with a continuous passage A', terminating at one end in an inlet $A^2$ and at the other end in an outlet $A^3$, and on the said valve-body is formed an extension $A^4$, containing a cage B, having a tubular body B', formed with openings $B^2$ in its side walls between the ends thereof, and on the ends of the said cage-body B' screw valve-seats $B^3$ $B^4$, on the inner one of which is adapted to be seated at the time the valve C, preferably in the shape of a ball. The opening movement of the valve C is limited by a stop D, extending into the cage through the outermost valve-seat $B^4$ and screwing in a cap E, screwing in the outer end of the extension $A^4$ to close the same and to engage the outer face of the cage at the seat $B^4$ to hold the cage in firm position in the extension $A^4$ and to press the inner end of the cage B into contact with a gasket F, held on an annular shoulder $A^5$, integral on the valve-body A and extending in the continuous passage between the inlet and outlet ends thereof.

By the arrangement described leakage is prevented between the cage and the annular shoulder $A^5$, and by having the stop D screwing in or out in the cap E it can be made to extend a longer or shorter distance into the cage to decrease or increase the opening movement of the valve C, and hence permit regulating the amount of fluid passing through the check-valve in a given time.

In case the valve-seat $B^3$ is worn out it is only necessary for the operator to unscrew the cap E and remove the cage B, with the valve therein, and then place the cage in a reversed condition back into the extension $A^4$, so that the valve-seat $B^4$ is now the innermost or active valve-seat for the valve C. The cap E, with its stop, is then replaced and the check-valve is again ready for service. In case both valve-seats are worn out they can be readily unscrewed from the cage-body B' and replaced by new ones.

In the bottom of the passage A' is arranged a drain-cock G for draining the check-valve whenever it is desired to do so.

Having thus described my invention, I claim as new and desire to secure by Letters Patent—

1. A check-valve having a valve-body provided with a continuous passage, a cage removably held in the said valve-body and having a valve-seat screwing in the end of the cage and extending in the said passage, the valve-seat being removable with the said cage, a valve proper movable in the said cage and adapted to be seated on the said valve-seat, and a stop adjustable in the cage, to regulate the opening of the said valve, as set forth.

2. A check-valve having a valve-body provided with a continuous passage, a cage comprising a tubular body provided with openings in its side walls between the ends thereof, the said cage being removably and reversibly held in the valve-body and provided at its inner end with a valve-seat screwing into the cage, a valve proper in the cage and adapted to engage the said seat, a valve-seat screwing in the outer end of said cage-body, a cap screwing on the valve-body and adapted to engage the outer valve-seat, and a stop extending through the outer valve-seat into the cage, to be engaged by the valve therein, the said stop being adjustable in direction of the length of the cage, as set forth.

3. A check-valve having a valve-body provided with a continuous passage, a cage removably and reversibly held in the valve-body and provided at both ends with valve-seats screwing into the ends of the cage, a valve proper in the cage between the said seats, a stop extending through one of the valve-seats into the cage, to be engaged by the valve therein, and a cap on the said valve-body, adapted to engage the cage, to hold the latter in place, the said cap having a screw-threaded recess in its inner face into which the stem of said stop screws, as set forth.

In testimony whereof I have signed my name to this specification in the presence of two subscribing witnesses.

NICHOLAS OBOLENSKU.

Witnesses:
 GEO. E. WARNER,
 J. B. KILEY.